(12) United States Patent
Allen et al.

(10) Patent No.: US 11,988,496 B1
(45) Date of Patent: May 21, 2024

(54) STRIP WIDTH MEASUREMENT WITH CONTINUOUS HARDWARE IMPERFECTION CORRECTIONS OF SENSED EDGE POSITIONS

(71) Applicant: Advanced Gauging Technologies, LLC, Plain City, OH (US)

(72) Inventors: Todd Allen, Plain City, OH (US); Nick Hunkar, Plain City, OH (US); John Bihn, Plain City, OH (US)

(73) Assignee: Advanced Gauging Technologies, LLC, Plain City, OH (US)

( * ) Notice: Subject to any disclaimer, the term of this patent is extended or adjusted under 35 U.S.C. 154(b) by 193 days.

(21) Appl. No.: 17/700,918

(22) Filed: Mar. 22, 2022

(51) Int. Cl.
  *G01B 11/04* (2006.01)
  *G06T 7/80* (2017.01)

(52) U.S. Cl.
  CPC .............. *G01B 11/046* (2013.01); *G06T 7/80* (2017.01)

(58) Field of Classification Search
  CPC ............... G01B 11/046; G01B 21/042; G01N 2001/2893; G06T 7/80; G06T 2207/30204; G06T 2207/30208
  See application file for complete search history.

(56) References Cited

U.S. PATENT DOCUMENTS

| | | | |
|---|---|---|---|
| 3,663,108 A | 5/1972 | Yamamuro et al. | |
| 4,670,659 A | 6/1987 | Loose | |
| 6,459,494 B1 | 10/2002 | Kurokawa et al. | |
| 6,650,397 B2 | 11/2003 | Lucey et al. | |
| 7,310,148 B2 | 12/2007 | Dircksen et al. | |
| 7,414,739 B2 | 8/2008 | Barker | |
| 9,372,079 B1 | 6/2016 | Wu et al. | |
| 2002/0176059 A1* | 11/2002 | Lucey | B65H 43/08 |
| | | | 355/75 |
| 2011/0235054 A1* | 9/2011 | Koike | B25J 9/1697 |
| | | | 356/620 |
| 2016/0292861 A1 | 10/2016 | Wolf et al. | |
| 2019/0122388 A1* | 4/2019 | Li | G06T 7/80 |
| 2020/0388053 A1* | 12/2020 | Wallack | H04N 13/282 |
| 2021/0291376 A1* | 9/2021 | Wang | G01B 21/042 |

OTHER PUBLICATIONS

Adarsh Menon, Linear Regression Using Least Squares, publication, Jan. 24, 2022, pp. 1-6, Towards Data Science Inc., Canada.

* cited by examiner

*Primary Examiner* — Michael P LaPage
(74) *Attorney, Agent, or Firm* — Frank H. Foster; Kremblas & Foster

(57) ABSTRACT

A method and apparatus for measuring the width of a strip or the widths of multiple strips being conveyed longitudinally through a sensing region of a gauge. The apparatus includes a correction bar that has very highly accurately machined edges and includes a laser point displacement sensor that traverses across the sensing region of the gauge of the invention. The method of the invention uses the correction bar by sensing its edge distance positions and using the data for the sensed edge distance positions and data for its highly accurately known edge distance positions to generate corrections for all distance positions continuously across the entire sensing region. Corrections are then made to sensed edge distance positions of a strip or strips being sensed by the gauge, regardless of the positions of the strip edges.

2 Claims, 6 Drawing Sheets

STRIP WIDTH MEASUREMENT WITH CONTINUOUS HARDWARE IMPERFECTION CORRECTIONS OF SENSED EDGE POSITIONS

BACKGROUND OF THE INVENTION

This invention relates generally to the measurement, using a laser and optical sensor, of the widths of product workpieces being conveyed through a gauge sensing region of a manufacturing production line. More particularly the invention is directed to measuring the width of a strip or strips using a laterally traversing, laser point displacement sensor and to enhancing the accuracy of the sensed widths by preliminarily obtaining distance corrections for correcting sensed distance positions of edges that are laterally arranged across the sensing region. The "distance position" of an edge is the lateral distance from a reference position to the edge. A "distance correction" (usually referred to simply as a "correction") is a numerical value representing the deviation or offset of a sensed distance position from the actual distance position.

In many manufacturing processes workpieces are conveyed along a production line that has a series of staged manufacturing operations at which the workpiece is acted upon. Often it is desirable to measure the width of the workpiece at one or more stages for quality control. One such type of workpiece is a ribbon-like strip of a sheet material that is advanced along the production line. In some manufacturing operations, the ribbon is longitudinally cut into multiple parallel strips. Each parallel strip is often alternatively called a "mult". When there are multiple such strips it is usually desirable to measure the width of all the strips.

The prior art has provided commercially available gauges for measuring the width of a strip. These prior art gauges direct light, including laser light, onto the strip and orient a video camera to capture a video image of the illuminated sheet. The prior art systems then use video image analysis to sense the width of a strip or strips. Although the video camera systems are sufficiently accurate for some applications, their accuracy is limited by camera resolution and is insufficient for other applications. The difficulty with video analysis is that video resolution is only as accurate as its pixel size. The pixel size is known for a known distance from the camera to a sensing region. Therefore the number of pixels between edges can be counted by video analysis and multiplied by the pixel size to find the width. Consequently, resolution is limited to the pixel size. Since a distance represented by a video pixel is a function of distance from the sensor, any movement of the strip or workpiece away from its designed nominal position and closer to or farther from the sensor will change the distance represented by a pixel and therefore cause a measurement error. In order to obtain sufficiently high resolution for applications requiring high accuracy, video cameras would need to be closer to the target than is practical. The cameras need to be close in order to get a pixel size that represents a sufficiently small dimension on the target. But that would limit their field of view so multiple video cameras would be needed to get sufficient resolution.

The prior art has also provided commercially available devices known as laser point profilers or pinpoint laser profilers. A point laser projects a laser light beam that is incident on a surface to form a point not a line, scanned area or other shape. The term "point" is used in this document interchangeably with the terms "dot", "spot" and "pinpoint" all having the same meaning. It is an area on a surface on which a laser light beam is incident and has a shape and size that is substantially the same as a cross section of the laser light beam. A point laser profiler typically is mounted above a conveyer and projects its beam vertically downward across products that are moving on the conveyer to generate data from the resulting scan across the products. The data represents a cross section through the products.

A point laser profiler includes components that can be adapted for use as a laser point displacement sensor so it can be used with the invention. A displacement sensor is an electromechanical device that has a point laser source and an optical sensor that are preferably mounted together in a small cabinet. The optical sensor senses the intensity of and the distance to a light point on a surface onto which the laser beam is incident. It is called a "displacement" sensor because it measures the distance between two points by displacing either the object or the sensor from one position to another position, storing the two positions and computing the distance between the two positions by subtracting the farther position from the nearer position.

The laser point profiler has connected computing electronics for controlling its devices, reading sensed analog and digital data and making calculations from the data, such as calculating the distance from the optical sensor to the light point on a surface. It also can receive data representing the velocity or instantaneous position of the objects being sensed. As objects on a conveyer pass under the laser point profiler and the laser light travels across the moving objects, the laser point profiler collects height data and builds a profile. By sensing height data (derived from distance from the displacement sensor) laser point profiler senses the edges of the traversing objects and stores their positions.

A commercially available laser point profiler that can perform the functions described above and can be adapted for use with the invention is a "Gocator"® 1300 series laser point profiler sold by LMI Technologies Inc. However, to the knowledge of the inventors, a point laser profiler has never been used as a point laser displacement sensor to sense the width of a strip or strips. One reason is believed to be that prior art workers to whom that idea could have occurred, would conclude that such a device would give insufficiently accurate measurements. The reason for the inaccuracy is that, in order to measure the width of a strip, a point laser displacement sensor would need to move laterally across the strip or strips. But, as a point laser and sensor would traverse laterally the strip, the strip would also be moving longitudinally. Since it would take time to traverse the point laser and optical sensor from one side of the strip to the other, the device would actually be measuring a diagonal distance. So the likely conclusion would be that a traversing point laser and optical sensor would not be fast enough to provide accurate strip width measurements.

There is an additional source of measurement errors that can be a practical problem for any laser displacement sensor if a high accuracy measurement is required for a particular application. Hardware imperfections that are inconsequential or minor for many, if not most, applications can be very consequential and cause unacceptable measurement errors in applications that require high accuracy. Some hardware imperfections are inherent in all mechanical component parts. Mechanical parts are usually machined or otherwise manufactured to have an accuracy within manufacturing tolerances. Although component parts are within their specified tolerance range, they still have dimensions that deviate from their nominal dimensions. Those deviations are inherent in all manufacturing processes and can be a source of measurement inaccuracy. For example, a gauge may utilize a sled that traverses along a track and is driven by a linear actuator. The linear actuator may include a screw drive for transporting the sled along the track. A linear or rotary encoder may be used for sensing the sled position along the track. Typically, the track and other components are mounted to a support frame. Any bow or warp in the sled track or any warp or runout in the screw drive, such as being off center or out of round, even if these components are within their specified manufacturing tolerance range, will cause an error in a sensed width. Similarly, any deviations of the encoder from its nominal specifications will cause errors in a sensed width. The result is that moving a sled back and forth inherently has a degree of what engineers call "slop". So the position of the sled at each instant of time is not accurate enough when high accuracy is required.

Additionally, manufacturing equipment on a factory floor is subject to occasional accidental impact from other objects on the factory floor. An impact can cause hardware imperfections that result in measurement errors. The impact can be caused by such things as fork lifts that are transporting materials or by tools that are being handled by employees. A gauge support frame may be impacted and show no visible sign of damage but nonetheless be distorted from its original configuration. Some factories have a thermal environment and the temperature of that environment can cause expansion and/or contraction of the mechanical components, including the support frame. These and other things can cause hardware imperfections that result in sensing errors. Although those sensing errors are small enough to be acceptable for most applications, they can be unacceptable to applications where very high accuracy is required.

It is therefore a purpose and object of the invention to provide a method and an apparatus for high accuracy measurement of the width of workpieces being conveyed through a gauge's sensing region and also to provide a method and apparatus for correcting width sensing errors that result from the kinds of hardware imperfections and sources of inaccuracy that have been described, both the inherent manufacturing deviations from nominal dimensions and imperfections that result from accidental impacts or factory environment.

SUMMARY OF THE INVENTION

The invention is a method and apparatus for measuring the width of a strip or the widths of multiple strips being conveyed longitudinally through a sensing region of a gauge. The apparatus includes a correction bar with alternate lands and grooves that form very highly accurately machined edges between the lands and grooves and also includes a laser point displacement sensor that traverses across the sensing region of the gauge of the invention. The method of the invention uses the correction bar by sensing its edge distance positions and using the data for the sensed edge distance positions and data for its highly accurately known edge distance positions to generate a mathematical expression that is used to correct sensed strip edge distance positions at any distance position continuously across the entire sensing region. Corrections are then made to sensed edge distance positions of a strip or strips being sensed by the gauge, regardless of the positions of the strip edges. The corrections are independent of the imperfections that cause the measurement errors.

Figure 1:
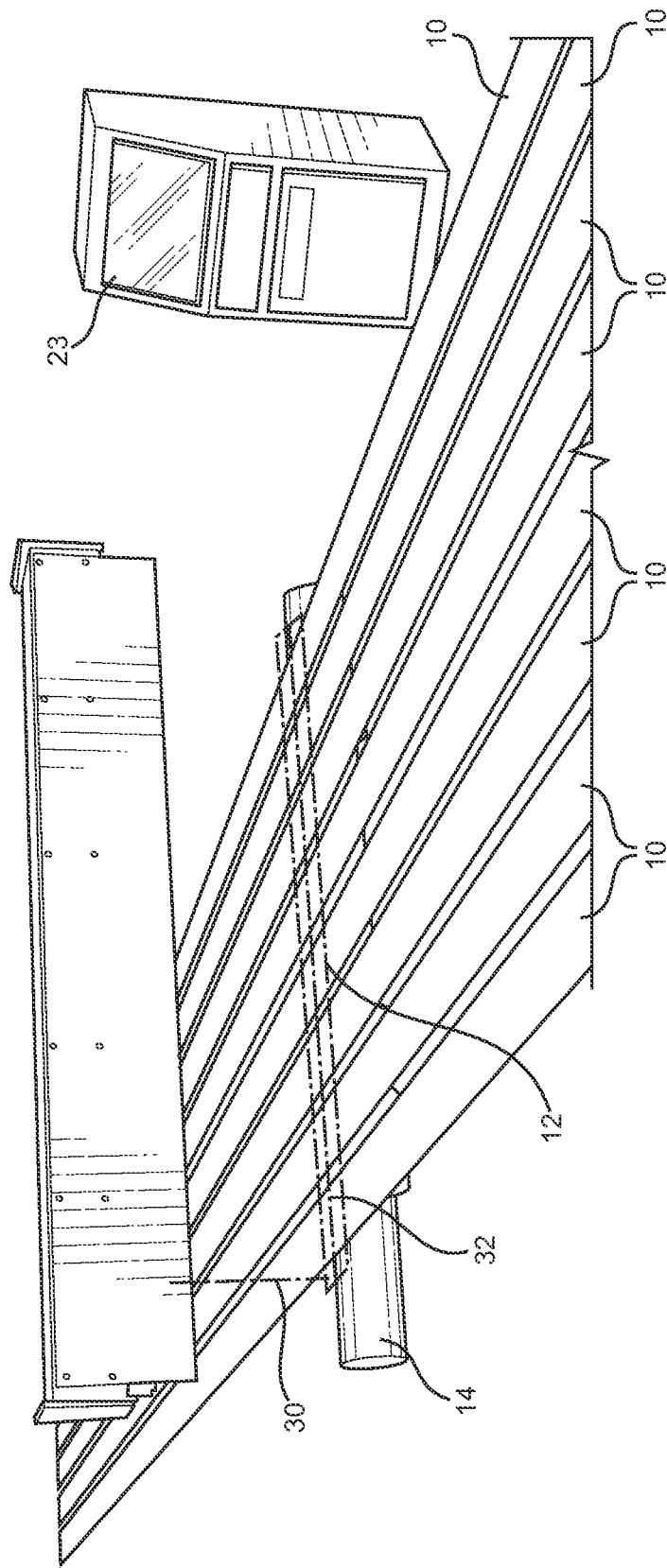
FIG. 1 is a view in perspective showing strips of a sheet material being transported through a gauge that embodies the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

This description will first be directed to the apparatus of the invention that is used to perform the method of the invention. The method of the invention will then be described.

APPARATUS

Figure 2:
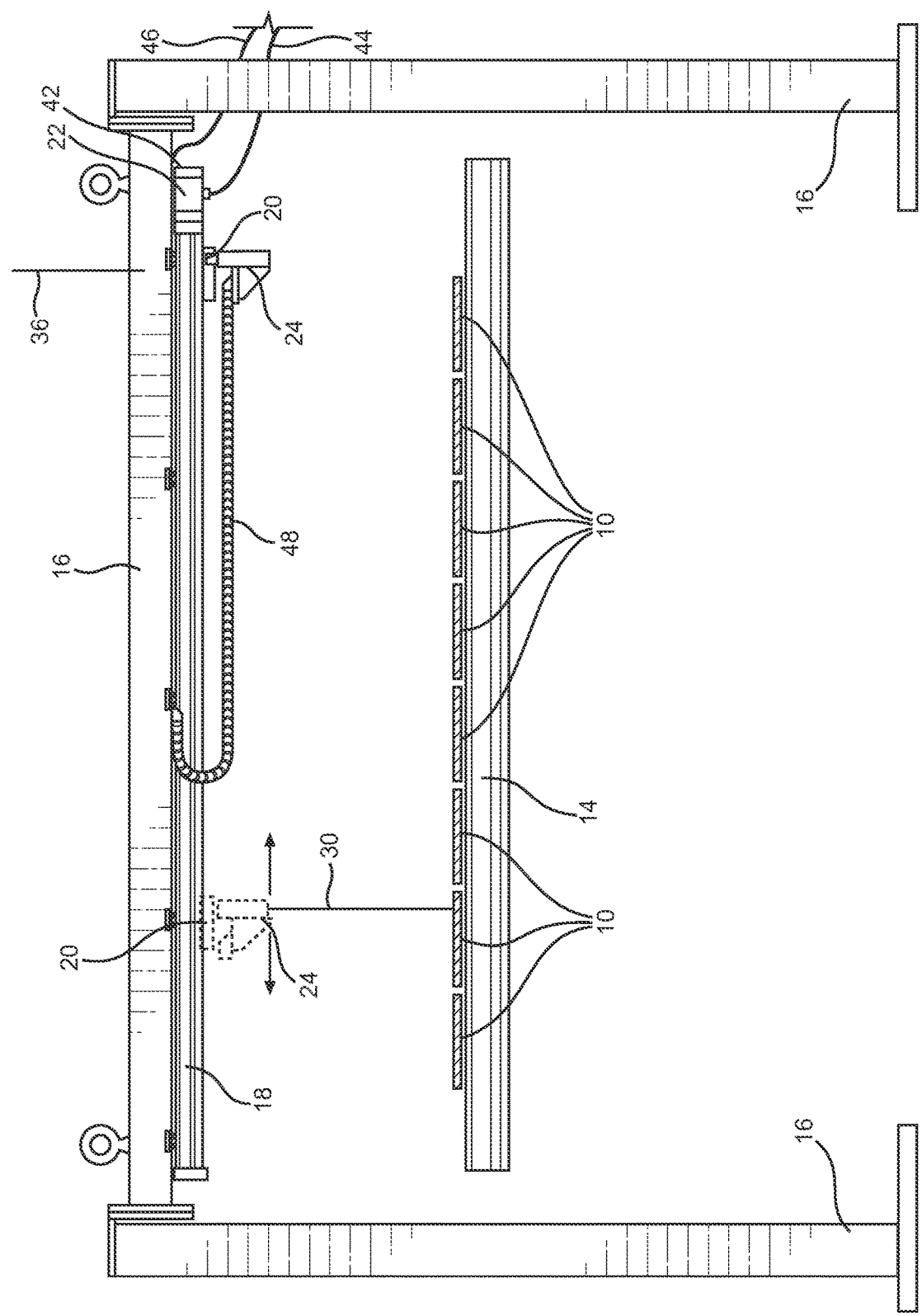
FIG. 2 is a side view of the embodiment of FIG. 1.

FIGS. 1 and 2 illustrate apparatus embodying the invention for measuring the width of a strip or the widths of multiple strips 10 being conveyed longitudinally through a sensing region 12. The strips 10 are supported on a support bar 14 or other conveyer support component. The support bar 14 illustrates that a strip conveyer normally will have one or more components that support the strips. But the strip supporting structures are not a part of the invention. Preferably, any strip supporting structures are longitudinally offset from the passline 32. If there are any structures at the passline 32 and below the strips, there should be a spacing of at least a few inches between the underside of the strips 10 and the structure. The spacing or offset prevents the gauge from generating erroneous data by sensing the structure and processing that sensed data as if it originated from sensing the strips 10.

Attached beneath the horizontal top beam of the support frame 16 is a track 18 that extends across the strips 10 and beyond the opposite outer boundaries of the strips 10. A sled 20 is mounted to the track 18 and configured so that it can be driven in reciprocation back and forth between opposite ends of the track 18. The term sled is meant to indicate a carriage that is driven along a path and can support other devices so that the other devices move with the carriage.

A linear actuator drives the sled 20 along the single axis of the track 18 laterally of the strips 10 under the control of a digital computing circuit or controller 23. The preferred linear actuator includes a stationary electric motor 22 that is mounted at the end of the track 18 and rotates a screw extending along the track 18. A nut member (not visible), which threadedly engages the screw, is attached to the sled 20. The electric motor 22 rotates the screw in clockwise and counterclockwise directions to alternately traverse the sled 20 along the track in left and right directions. Of course other linear actuators may be used.

A rotary encoder 42 is linked to the electric motor 22 of the linear actuator. The rotary encoder 42, in combination with the computing circuitry, is configured to sense distance positions of the sled 20 from the reference position 36. As known to those skilled in the art, a rotary encoder continuously senses the rotary position of the electric motor's rotor. A data stream representing the rotary position of the motor 22 as a function of time is translated by computer software into data representing the distance position of the sled 20. Alternatively, other encoders, such as a linear encoder, can be used to sense distance positions of the sled 20 from the reference position 36.

A laser point displacement sensor 24 is mounted to the underside of the sled 20 so that the sled will transport the point displacement sensor 24 laterally across the strips 10. The use of a point laser is a critical feature of the invention. As far as is known, no prior art uses a point laser to measure or sense the width of a strip or strips or anything else. The invention uses a pinpoint profile laser as the point displacement sensor 24 for sensing distances. Although the pinpoint profile laser that is used as the invention's laser point displacement sensor 24 includes a distance sensor, the invention does not generate a profile to build an image.

Figure 5:
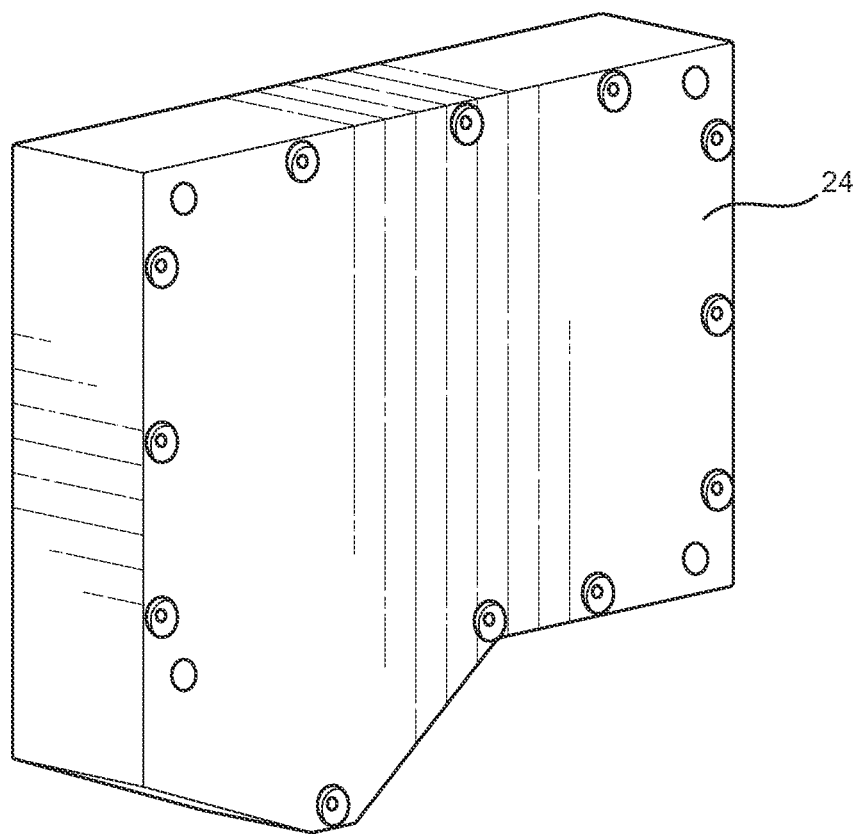
FIG. 5 is view in perspective of a laser point displacement sensor that is used in the invention.
Figure 6:
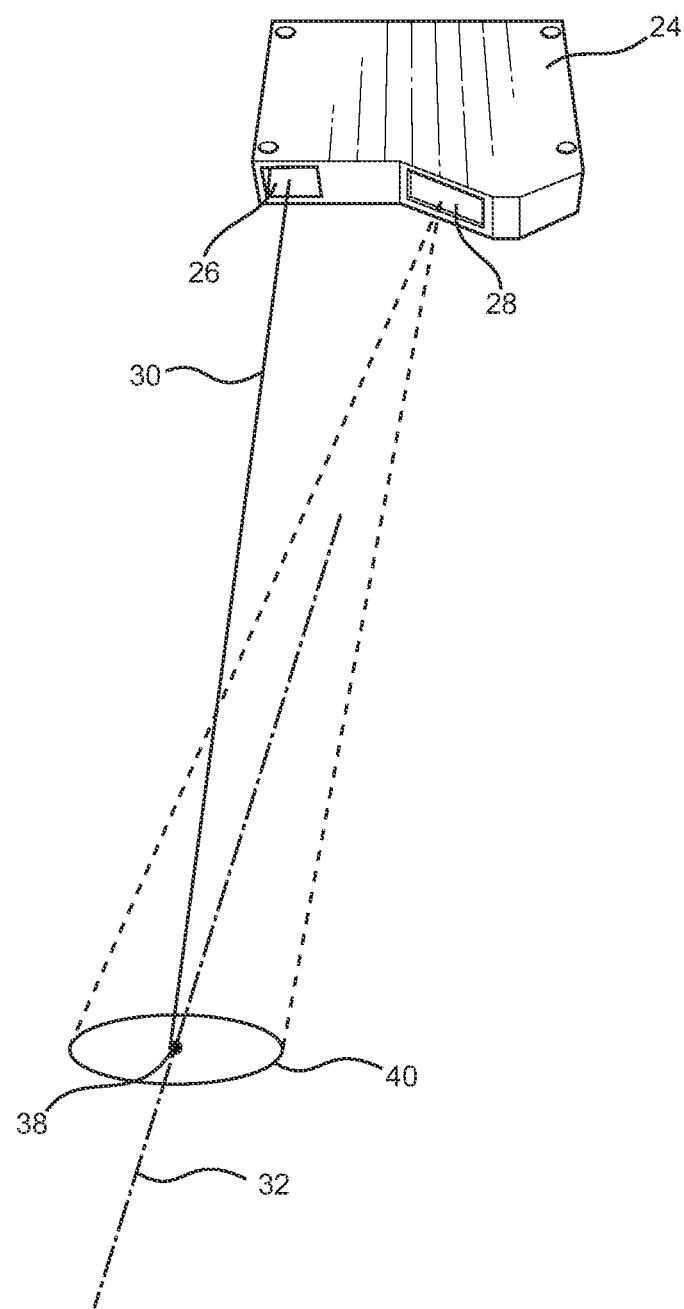
FIG. 6 is a view in perspective of the laser point displacement sensor of FIG. 5 and illustrating its laser beam and field of view at the passline of the gauge embodying the invention.

The point displacement sensor 24 is shown in FIG. 2 both while at rest at a reference position 36 and in dashed lines to illustrate its traversing motion. The preferred laser point displacement sensor 24 is the commercially available "Gocator"® that was described above. It is also illustrated in FIGS. 5 and 6 and includes a point laser 26 and an optical sensor 28. It also has on-board computing circuitry for processing data and is capable of processing data for controlling its point laser 26 and optical sensor 28, for communicating data to other data processing circuits and for receiving and processing incoming data. As known to those skilled in the art, the computing or data processing circuitry can be distributed in different cabinets and locations.

Electrical wires for transmitting electrical power to the electric motor 22 under computer control and for communicating data from the rotary encoder 42 are housed in an electrical cable 44. The cable 44 provides communication of rotary encoder data to the on-board computing circuitry of the laser point displacement sensor 24 and to the digital computing circuit or controller 23. Electrical wires for transmitting electrical power and for data communication with the displacement sensor 24 are housed in a second electrical cable 46. The second electrical cable 46 extends into a wire track that extends along the sled track 18 and is supported in a commercially available flexible wire track formed by a drag chain cable carrier 48. The cable carrier 48 protects the wires of the cable 46 and keeps them from dangling down as the sled 20 traverses laterally along the track 18.

The sled 20 traverses the point displacement sensor 24 along a line that is aligned to direct its pinpoint laser beam 30 from its point laser 26 along a passline 32 in a sensing region 12 that is oriented laterally of the strip or strips 10. The sensing region 12 of the gauge is the region in which the workpiece is positioned so that the laser beam 30 is incident on the workpiece and its sensor 28 can see and sense the reflection of the laser 30 beam from the workpiece. In the preferred embodiment, the laser beam 30 is vertical and perpendicular to horizontally oriented strips 10 so that the point displacement sensor does not find an alternative edge due to material thickness. Of course other orientations of the strips and the path of the point displacement sensor are possible. For example, the displacement sensor could be traversed laterally below horizontally oriented strips or beside vertically oriented strips. The laser beam could be oriented horizontally or at any angle to horizontal. Preferably the plane of the strips is perpendicular to the path of the laser beam. Regardless of the orientation, the optical sensor 28 is oriented to receive reflections of the laser beam 30 from the laser beam spot 38 on the strip or strips in the sensing region 12. Because the point laser 26 and the optical sensor 28 are housed in the same enclosure and moving on the sled 20, the light spot 38 on the strips 10 will always be in the field of view 40 of the optical sensor 28 as the displacement sensor 24 traverses across the strips 10.

The point laser 26, the optical sensor 28, the linear encoder 42 and the linear actuator 22 are all connected to and controlled by the digital computing circuit 23 and the point displacement sensor's on-board computing circuitry. Of course some computing and controlling components can be located in other cabinets and locations. Regardless of where located, the computing circuitry also performs mathematical calculations from data signals, such as those received from the optical sensor 28 and the linear encoder 42.

Figure 3:
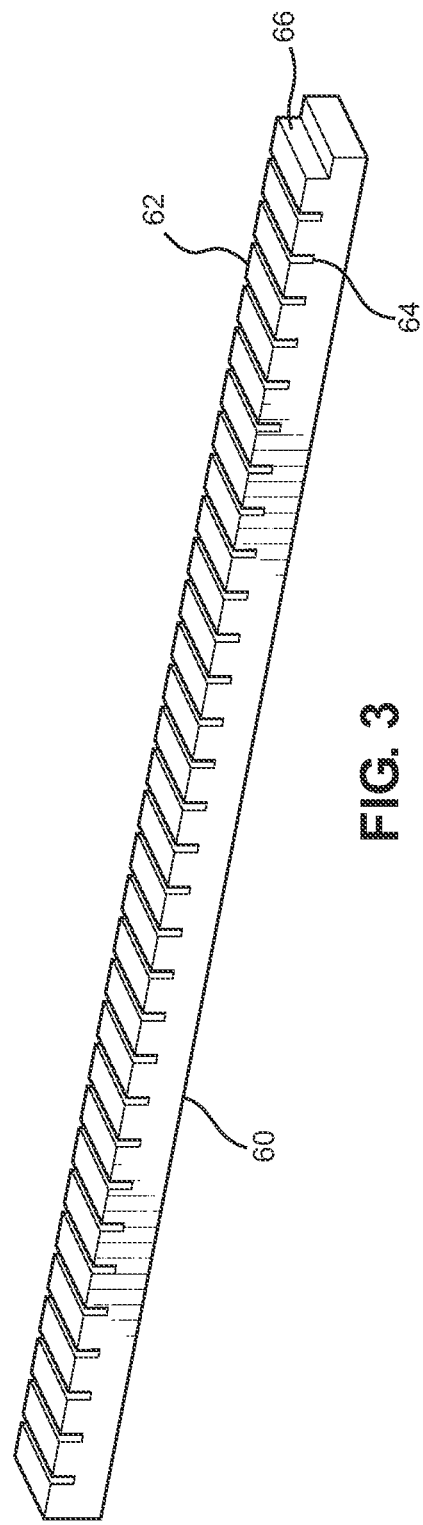
FIG. 3 is a view in perspective of a correction bar that is part of an embodiment of the invention and is used in the method of the invention.
Figure 4:
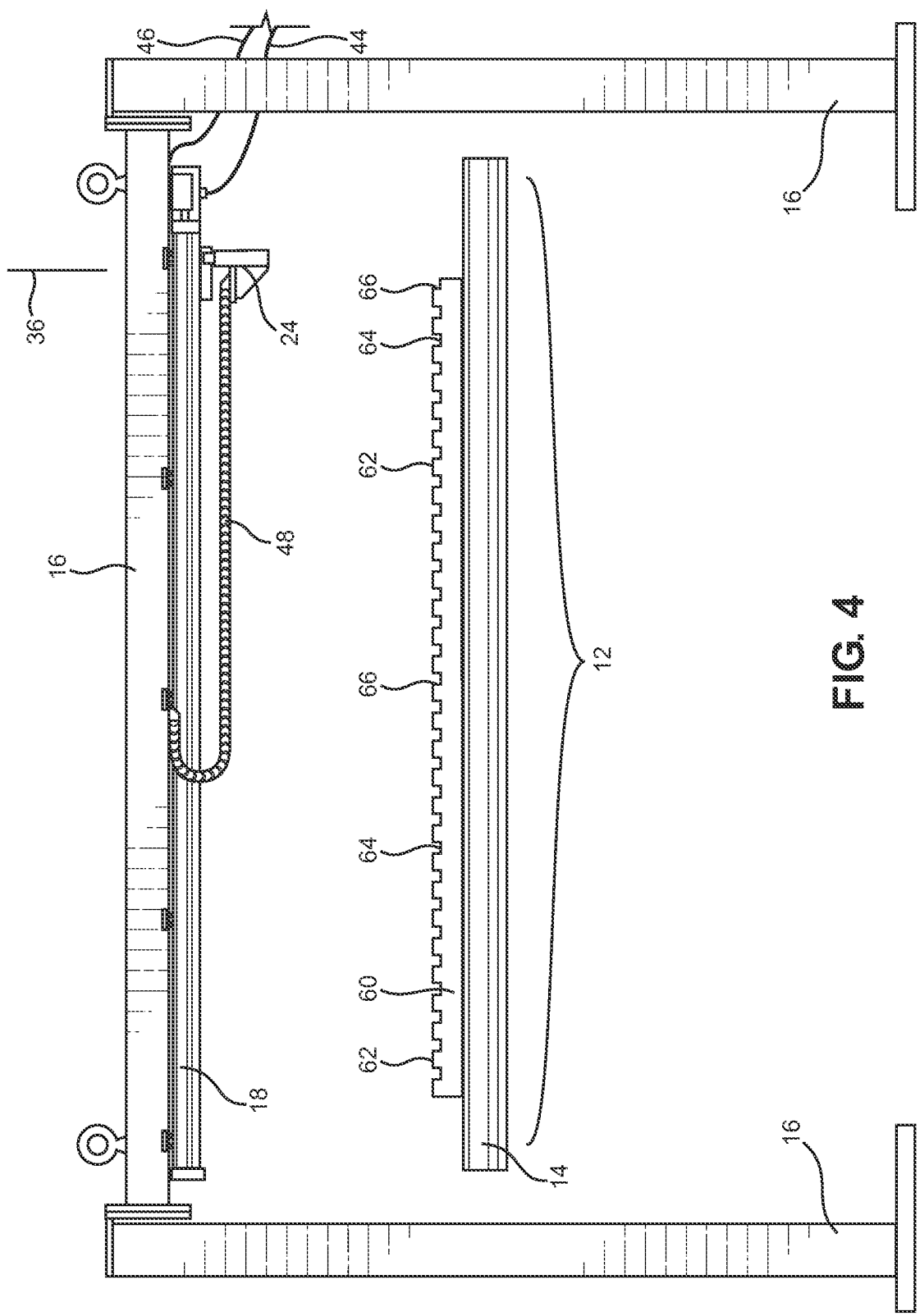
FIG. 4 is a side view of the embodiment of the invention with the correction bar of the invention positioned in a gauge that embodies the invention.

A critically important part of the invention is a correction bar 60 and the manner of its use in the method of the invention. The correction bar 60 is illustrated in FIGS. 3 and 4. Although the manner of its use will be described in detail as part of the later description of the method of the invention, in general the correction bar is used by positioning it in the sensing region parallel to the line of travel of the sled and sensing the distance positions of its edges. From the sensed distance position data for the correction bar and from data representing the known distance positions of the correction bar edges, a mathematical algorithm is generated that provides corrections for all subsequently sensed strip edge distance positions continuously across the sensing region.

Referring to FIGS. 3 and 4, the preferred physical embodiment of the correction bar 60 is an aluminum bar that has a series of alternating lands 62 and grooves 64 which form a series of spaced, parallel, correction bar edges 66 at the intersections of the lands 62 and the grooves 64. As will be seen, the correction bar edges can be thought of as simulated strip edges that are located at positions which are fixed and known with very high accuracy. The preferred lands 62 are 0.500 inches wide and the preferred grooves 64 are 0.250 inches wide both in the longitudinal direction of the correction bar 60. The preferred depth of the grooves is 0.375 inches. Preferably, the lands 62 have planar top surfaces and the grooves 64 have planar bottom surfaces. As will be appreciated, other dimensions and physical configurations can be used if they are based on the principles of the invention.

An important requirement for the construction of the correction bar 60 is that, when the point laser beam travels across an edge of the correction bar 60, the edge should not be inclined in a direction that would allow the laser light dot to travel along an inclined surface between a groove and a land. The edges 66 of the preferred embodiment are perpendicular to the longitudinal axis and the bottom surface of the correction bar 60 so that they provide a sharp, clearly defined edge. The edges 66 do not taper from the lands 62 inwardly into the grooves 64. However, the edges could taper from the surface of the lands outwardly away from the grooves and under the lands.

The correction bar edges 66 are machined to a very high accuracy so that they have precisely known distances between the edges 66. Because the distances between the correction bar edges are precisely known, when the correction bar 60 is positioned in the sensing region 12 the distance positions of its edges 66 from the reference position 36 of the point displacement sensor 24 are also precisely known. Consequently, the precisely known, high accuracy distance positions of the correction bar edges 66 from the reference position 36 can be stored in the computing circuitry for later processing. For purposes of the present invention the term "precisely known distance" means that a distance, and particularly the distances between the correction bar edges and therefore the distance from the reference position 36 to each correction bar edge, is known to an accuracy at least as good or better than ±0.010 and could be ±0.005 inches. However, the preferred "precisely known distance" is known to within an accuracy of ±0.001 inches.

Of course the formation on the correction bar of a series of alternating lands and grooves with interposed edges is not limited to the rectangular angles and shapes of the illustrated preferred embodiment. Other configurations would be suitable if they provide a series of edges that alternately rise and fall sharply between two levels and are arranged along a structure that can be positioned in the sensing region with its edges arranged along the sensing region.

Method for Measuring the Width of a Strip of Widths of Mults

The following is a description of the method of the invention and its use with the apparatus that was described. As will become appreciated, the invention is not that a laser is used to measure the width of a ribbon or strip. Important features of the invention are: (1) the use of a point laser and the associated sensing of a light point instead of the use of video analysis; (2) the point laser and its associated sensor are traversed laterally across the strip or strips; and (3) in order to correct for sensing errors that vary as a function of distance position from a reference, the method of the invention obtains a correction for every distance position continuously along the sensing region. As a result, no matter where the strip or strips and their edges are positioned laterally across the sensing region, highly accurate corrected widths are determined by the gauge.

The ultimate purpose of the invention is to measure with high accuracy the width of a strip or the widths of multiple strips being conveyed longitudinally through a gauge's sensing region. The high accuracy is obtained by first generating data that will be used to obtain corrections to be made to subsequently sensed measurements of the widths of strips. The corrections will be applied to the subsequently sensed measurements of the strip or strips to correct for errors that result from the sources of measurement errors that were described above. The corrections are generated as a function of distance positions across the sensing region to provide a correction map. When a strip edge is sensed at a particular location, the invention provides a correction associated with that location. The method uses a laser point displacement sensor that traverses a point laser and an optical sensor along a line that is aligned to direct a point laser beam from the point laser along a passline laterally across the strip or strips.

Looking at the method of the invention in more detail, the method begins with positioning a correction bar 60, constructed as described above, along the sensing region 12 of a gauge of the type previously described. The correction bar 60 has a series of alternating lands 62 and grooves 64 that are machined in the correction bar to form a series of spaced, land edges having precisely known actual distance positions of the land edges along the correction bar 60. Because the distance positions of the correction bar edges from each other are precisely known, when the correction bar 60 is positioned at the sensing region 12, the distance positions of the correction bar edges from a reference position 36 of the of the laser point displacement sensor 24 along its track are readily ascertainable and therefore can be stored in the controlling computer.

The distance positions of the land edges 66 of the correction bar 60 from the reference position 36 are then sensed, across a sensing region, which is oriented along the length of the correction bar 60. The distance positions are sensed by traversing the laser point displacement sensor 24, which includes the point laser 26 and an optical sensor 28, along a passline 32 that is aligned to direct its laser beam 30 from the point laser 26 along the correction bar 60 in the sensing region 12.

As the laser point displacement sensor 24 traverses across the correction bar 60, the sensed distance positions of the correction bar edges 66 are measured and recorded in computer memory. This generates a data set of sensed and stored distance positions for the positions of the edges 66 along the length of the correction bar 60.

Because the edges of the correction bar were machined to a very high accuracy, the distance positions of the correction bar edges along the correction bar are also known with high accuracy. Consequently there is a second data set of precisely known distance positions of edges along the length of the correction bar 60. The data set of the known distance positions of the correction bar edges 66 and the data set of sensed distance positions of the correction bar edges 66 are both stored in computer memory.

The algebraic difference between each precisely known distance position of a correction bar edge and its nearest sensed distance position is a measurement error. The absolute value of each measurement error is the absolute value of a correction that can be applied to a subsequently sensed strip edge distance position. Because there are several sensed correction bar edge distance positions, a digital processor that forms part of the gauge calculates the algebraic sum of each sensed correction bar distance position with its nearest corresponding actual known distance position to generate a data set of corrections. Each correction in the data set of corrections is associated with a distance position from the reference 36. Distance positions in two data sets (sensed and accurately known) correspond when they are a pair of positions that are closest to each other.

Because each correction in the data set of corrections is applicable only to its one associated distance position along the sensing region, at this stage in the process there are no corrections for distance positions that are between the corrections in the correction data set. However, it is desirable to be able to obtain a correction for any sensed distance position continuously across the sensing region. In order to be able to obtain continuous corrections, a regression analysis is applied to the data set of corrections and their associated correction bar distance positions. Regression analysis is a known type of mathematical curve fitting procedure. It provides a method for converting a two dimensional data set (multiple associated x,y pairs) to an equation that, if graphically plotted, would approximate a graph of the data set. In the invention, regression analysis can be used to calculate a mathematical function that expresses a correction (as a dependent variable) as a function of a sensed distance position (as the independent variable) without any discontinuity across the sensing region. This allows any sensed distance position to be inserted in the mathematical function as its independent variable and the mathematical function to be performed to obtain a correction (as the dependent variable) for the sensed distance position. For example, a linear regression analysis using the least squares method will provide a mathematical function in the form of Y=mX+c where X (sensed distance position) is the independent variable and Y (correction) is the dependent variable. Linear regression results in a line of best fit. Least squares method means that the sum of the squares of the vertical distances between the line of best fit and the points of the data set is minimized. Other regression analyses that are known in the field of mathematics can be used, some of which can give even greater accuracy but are more rigorous and would require more processor time to perform.

The mathematical function developed in this manner is then be used to calculate a correction for each actual sensed edge distance position of a strip or strips being conveyed through the gauge of a production line. For that purpose the edges of a strip or strips in the sensing region of the gauge are sensed. More specifically, as the strip or strips are conveyed through the gauge, the distance positions of the strip edges are sensed across the sensing region as the point laser and optical sensor are carried by the sled 20 laterally across the strip or strips. The result is a data set of sensed distance positions of the edges of the strip or strips.

Each sensed distance position in the data set of sensed distance positions is then corrected. They are corrected by first inserting in the mathematical function as an independent variable each sensed strip edge distance position and then performing the mathematical function to obtain a correction for each sensed distance position. Each resulting correction is then algebraically summed with its associated sensed distance position to generate a set of actual (corrected) strip edge positions. Algebraically summed means that, for any error at a position location that causes a sensed distance position to be greater than the actual distance position, the correction will be subtracted from the sensed distance position. Similarly, for any error at a position location that causes a sensed distance position to be less than the actual distance position, the correction will be added to the sensed distance position. An error of one sign (direction) will, in effect mathematically, be a correction of the opposite sign so it can be algebraically summed with a sensed strip edge distance position to correct the sensed distance position.

The resulting set of actual strip edge positions are then used to calculate the actual width of the strip or strips from the differences between adjacent actual strip edge distance positions.

Of course it is neither necessary nor desirable to use the correction bar prior to each time the sled traverses across the strip or strips and senses the distance positions of its edges. In normal use, the steps of sensing the distance positions of strip edges are continuously repeated without repeating the calculations of corrections using the correction bar. However, whenever there is reason to suspect that the previous corrections have become inaccurate, such as from an impact against the gauge, the steps using the correction bar to obtain the mathematical function for obtaining corrections can be repeated in the manner described above.

The commercially available point laser profiler, which is described above and is adapted for use with the invention as a displacement sensor 24, has the capability of detecting the distance from the point laser profiler to a light spot on a surface. Consequently, it can be adapted to detect edges as it traverses along the sled track 18 so that it can be used with the invention. The distance to a point of light from the laser that is incident on the surface of the correction bar 60 or a strip 10 is sensed. An edge is detected by monitoring the distance data that is streaming into a data processing circuit and detecting an abrupt change in that distance.

The pinpoint laser profiler used for the invention can be programmed to store and process data only for distance measurements that are within a selected distance range. Distances that are beyond the selected range can be ignored or treated as an infinite distance. In order to sense the distance positions of edges of the correction bar 60, a distance range is programmed into the computing circuit. The distance range extends from above to below the expected position of the top surface of an object in the sensing region 12. By way of example, for sensing the edges 66 of the correction bar 60 the selected range can extend to 10 mm below the distance to the correction bar lands 62. With the lands 62 being more than 10 mm above the grooves 64, a lagging edge is detected when the sensed distance increases rapidly to a greater value beyond the farther range boundary so it is sensed by the computing circuitry as infinite. Similarly, a leading edge is detected when the sensed distance decreases abruptly from an infinite distance (beyond the range) to a finite distance. At the time an edge is detected, the distance position of the point displacement sensor or sled from the reference position 36 is stored.

The edges of a strip or strips are sensed in the same manner. However, a broader range may be used for measuring strip width depending upon the dimensions of a particular installation. Typically, for sensing workpiece edges the more distant boundary of the range may extend an inch or two to a few feet farther than the closer boundary of the range. The range may need to extend farther away when the strip or workpiece in an installation may move up or down or otherwise closer to or farther from the laser.

A further refinement of the method may also be applied to accommodate a small additional inaccuracy that has been discovered as a result of experimentation. For some embodiments of the invention the reaction times of the combination of the sensors and electronics are different when the laser light spot is crossing a leading/rising edge (i.e. as the sled traverses, a transition from the laser light beam not being incident on a surface to being incident on the surface) than when the light spot is crossing a lagging/falling edge (i.e. the light spot transitions from being incident on a surface to not being incident on that surface). It has been found that sensing a leading/rising edge may take more time than sensing a lagging/falling edge. That difference is believed to introduce a small inaccuracy.

In order to further increase the accuracy of the measurements, the method described above is applied separately to the four combinations of sled travel and edge type. The four combinations are (1) leading edges, sled traversing to the right, (2) lagging edges, sled traversing to the right, (3) leading edges, sled traversing to the left, and (4) lagging edges, sled traversing to the left.

In more detail, four data sets of sensed edge distance positons are separately stored when the edges 66 of the correction bar 60 are sensed. The four data sets for sensing the correction bar edges 66 are: (1) sensed leading edges with the sled traversing left to right; (2) sensed lagging edges with the sled traversing left to right; (3) sensed leading edges with the sled traversing right to left; and (4) sensed lagging edges with the sled traversing right to left. Of course there is only one data set of known distance positions for the edges 66 of the correction bar.

Then each of the four data sets of sensed edges is individually algebraically summed with the known data set in the manner described above to obtain four sets of corrections. That gives four data sets of corrections, each set associated with a type of edge (leading or lagging) and a direction of sled travel (left or right). Following that, a regression analysis is applied individually to each data set of corrections in the manner described above to provide four mathematical equations. Each equation is associated with a type of edge (leading or lagging) and a direction of sled travel (left or right).

The four mathematical equations are then used to correct the sensed edge distance positions of a strip or strips being transported through the gauge. More specifically, when the sled moves from right to left across the strip or strips, two data sets of sensed edges distance positions are stored. One set is for leading edges and one set is for lagging edges. Another two data sets are similarly stored when the sled traverses from left to right.

Each of those four data sets of stored sensed edge distance positions is then individually corrected using the mathematical equation generated for a sled travel direction and edge type that corresponds to the same sled travel direction and edge type of the stored data set of sensed strip edge distance positions.

REFERENCE NUMBERS KEY 10 strip or strips being measured
12 sensing region
14 strip support bar
16 support frame
18 sled track
20 sled
22 rotary electric motor
23 digital computing circuit or controller
24 laser point displacement sensor
26 point laser
28 optical sensor
30 laser beam
32 passline
36 reference position of the point displacement sensor
38 laser beam spot
40 field of view of the optical sensor
42 rotary encoder
44 cable to electrical motor and rotary encoder
46 cable to displacement sensor
48 cable carrier
60 correction bar
62 correction bar lands
64 correction bar grooves
66 correction bar edges This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for measuring the width of a strip or the widths of multiple strips being conveyed longitudinally through a sensing region using a laser point displacement sensor that traverses a point laser and an optical sensor along a line that is aligned to direct a laser beam from the point laser along a passline laterally of the strip or strips, the method comprising:
(a) positioning in the sensing region a correction bar that has a series of alternating lands and grooves that are machined in the correction bar and form a series of spaced, land edges having precisely known actual distance positions of the land edges from a reference position;
(b) sensing, across a sensing region, the land edge distance positions from the reference position to generate a data set of sensed correction bar distance positions;
(c) calculating with a digital processor, for each sensed correction bar edge distance position, the algebraic sum of each sensed correction bar distance position with its nearest corresponding actual distance position to generate a set of corrections, each correction being associated with a sensed correction bar distance position;
(d) calculating, from the set of corrections and associated correction bar distances and using a regression analysis, a mathematical function that expresses a correction as a dependent variable as a function of a sensed distance position as its independent variable, continuously across the sensing region;
(e) positioning the strip or strips in the sensing region;
(f) sensing the distance positions of the strip edges positioned across the sensing region;
(g) inserting in the mathematical function as a dependent variable each sensed strip edge distance position to generate a set of actual strip edge positions;
(h) calculating the actual width of the strip or strips from the differences between adjacent actual strip edge distance positions.

2. The method according to claim 1 wherein, following steps (a) through (d) of claim 1, steps (e) through (h) are repeated without repeating steps (a) through (d) of claim 1.

* * * * *